United States Patent [19]

Zellweger et al.

[11] Patent Number: 4,583,940
[45] Date of Patent: Apr. 22, 1986

[54] IGNITER FOR COMBUSTIBLE MATERIAL

[76] Inventors: Conrad Zellweger, 7, chemin des Voirons, 1224 Chene-Bougeries; Victor C. Spreter, 25, chemin de Ruite, 1252 Meinier, both of Switzerland

[21] Appl. No.: 626,857

[22] PCT Filed: Oct. 24, 1983

[86] PCT No.: PCT/EP83/00276
§ 371 Date: Nov. 23, 1984
§ 102(e) Date: Nov. 23, 1984

[87] PCT Pub. No.: WO84/01811
PCT Pub. Date: May 10, 1984

[30] Foreign Application Priority Data

Oct. 28, 1982 [CH] Switzerland ............... 6286/82

[51] Int. Cl.[4] ............................................. A24F 27/14
[52] U.S. Cl. ...................................... 431/269; 431/270; 44/45; 44/2; 44/35
[58] Field of Search ........................ 431/269, 270, 267; 44/45, 48, 35, 2

[56] References Cited

U.S. PATENT DOCUMENTS

| | | | |
|---|---|---|---|
| 670,141 | 3/1901 | Shepard | 431/269 |
| 1,577,166 | 3/1926 | Blamfield | 431/269 |
| 2,104,464 | 1/1938 | Klassen | 44/45 X |
| 3,508,853 | 4/1970 | Thurston et al. | 431/270 |
| 3,723,051 | 3/1973 | Bouvier | 431/267 |

Primary Examiner—Randall L. Green
Attorney, Agent, or Firm—Lewis H. Eslinger

[57] ABSTRACT

An igniter for combustible material includes a support, an element of a material capable of being ignited by friction, a movable friction-strip having a surface portion treated to produce ignition of the element by friction, and a plate secured to the support for holding and guiding the friction-strip is provided with an opening in front of the element. In operation, the friction-strip is pulled through the igniter, which brings the surface portion into frictional contact with the ignitable element and then uncovers the latter when ignited; the flame therefrom is available through the opening in the plate. Because the ignitable element is enclosed in a space between the support and the friction-strip, it is protected against destruction by mechanical impact or by humidity, as well as against accidental ignition due to friction with another body.

8 Claims, 4 Drawing Figures

IGNITER FOR COMBUSTIBLE MATERIAL

The present invention relates to an igniter for combustible material comprising a support for an element made of a composition capable of being ignited by friction and a friction-strip having a surface portion treated in order to produce the ignition of the element by friction.

In the known igniters of this kind, the element sensitive to friction is placed in such a manner that one of its sides is located in front of the material to be ignited, and its other side in front of the friction-strip. This necessitates to place the element on both sides of the support and to provide a communication either by means of perforations or marginally. This implies a difficult and complicated manufacturing.

Moreover, this device may accidentally be ignited by friction with a part of the device comprising the igniter or eventually with a body not belonging to the device.

The invention aims to remedy these drawbacks. The igniter according to the invention is characterized in that the element is located in a space comprised between the support and the friction-strip, the latter being conformed so that its displacement brings said surface portion into frictional contact with the element first, and then uncovers the latter when ignited.

The attached drawings show schematically and by way of example an embodiment and two modified embodiments of the igniter according to the invention.

Figure 2:
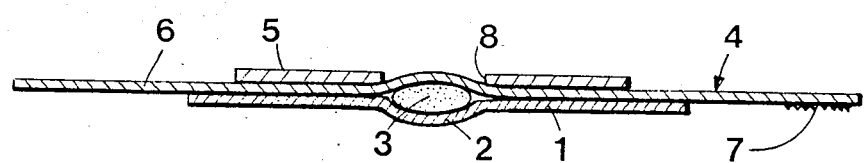
FIG. 2 is a longitudinal section thereof.
Figure 3:
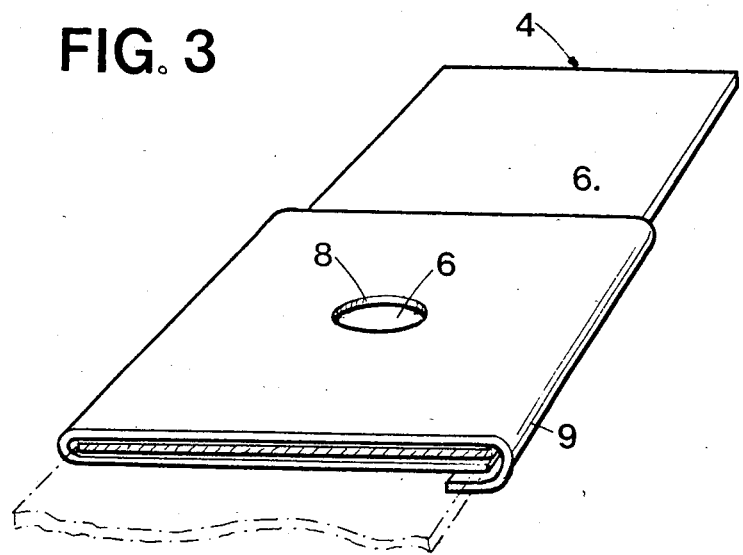
FIGS. 3 and 4 show modified embodiments of the igniter.

The igniter shown in FIGS. 2 and 3 comprises a support made of a sheet-metal 1 having a stamped cavity 2. This cavity is a recess in which is placed an element 3 and a material capable of being ignited by friction, this element having the form of a capsule. The igniter comprises a friction-strip 4 placed on a support 1 and a capsule 3, this friction-strip being maintained against the capsule by a metallic plate 5 secured to the support 1 by electrical welding.

The plate 5 is bent in such a manner as to form with the support 1 a channel for guiding and maintaining the friction-strip 4. The latter has a surface portion treated to produce the ignition of the capsule 3. For this purpose, it is made of a strip 6, an end of which is covered with a substance adapted to produce ignition of the capsule 3 by friction. The plate 5 has an opening in front of the capsule 3. As the capsule 3 protrudes from its cavity 2, the strip 6 is curved in front of the opening 8. This deformation creates a pressure of the strip 4 against the capsule 3. The latter is made of a substance similar to that of a match tip, for example a mixture of potassium chlorate and/or chromate, lead peroxide and antimony sulphide mixed with a strong glue. The friction surface of the friction-strip can be made, for example, of a mixture of ground glass, red phosphorus and antimony sulphide agglomerated with strong glue.

To light a combustible material, the part of this material to be ignited must be located in front of the opening 8. The capsule 3 is then ignited by a rapid pull of the friction-strip 4 while grasping the strip 6 by its end opposite to the one carrying the layer 7. This pull produces a sliding of the strip 6 between the support 1 and the plate 5, so that the layer 7 scratches the capsule 3. At the end of the displacement, the strip 6 uncovers the opening 8, so that the ignited capsule 3 lights the combustible material.

In the present arrangement, the igniting capsule 3 is located between the support 1 and the strip 6 so that it is protected from destruction by mechanical impact or by humidity. Moreover, the igniter offers more security due to the fact that the capsule cannot be ignited by accidental friction with an outer body.

The igniter according to the invention may be used, for example, for igniting a heating cartridge of a self-heating container of the kind described in our U.S Pat. No. 4,506,654.

In the embodiment of FIG. 3, the support and the holding and guiding means are obtained by a single plate 9, folded to form a channel. The two main faces of this plate are sufficiently folded to leave between them a distance lower than the thickness of the strip 6, so that the plate 9 must be slightly deformed to provide a passage for the strip which is elastically clamped between these faces. Thus, the elastical pressure is obtained for providing frictional contact between capsule 3 and the friction-strip 6.

Figure 4:
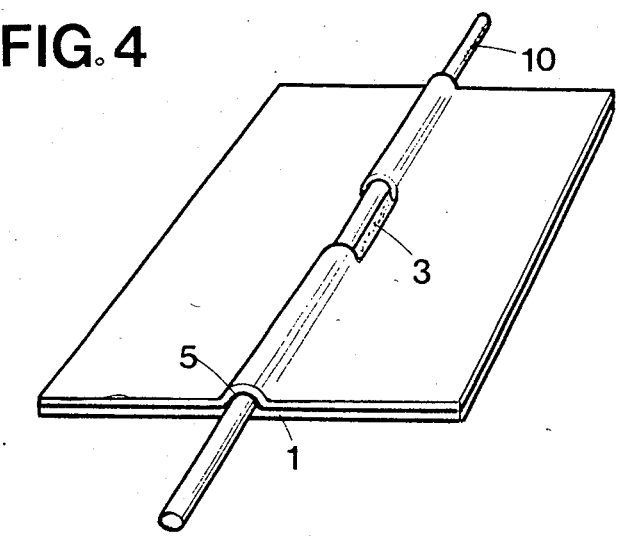

In the embodiment of FIG. 4, the friction-strip is constituted by an elongated member such as a string, an end of which is treated to constitute a friction strip 10. The channel formed between the support 1 and the plate 5 has a cross-section substantially corresponding to the section of the string.

It is obvious that numerous modifications may be provided, and particularly friction-strips and the holding and guiding means may have very different shapes. The friction-strip can be made of a disc having an open portion. The support carrying the element to be ignited would then be angularly moved with respect to the friction-strip, and the element when ignited would be placed in front of the open portion of the friction-strip.

In the example of FIG. 4, the friction-strip, instead of being constituted by a string, could be a rigid rod, for example a metallic rod, which could be treated to be rugged, so that ignition of element 3 could be obtained without having to coat the tip of the rod with a special substance.

Figure 1:
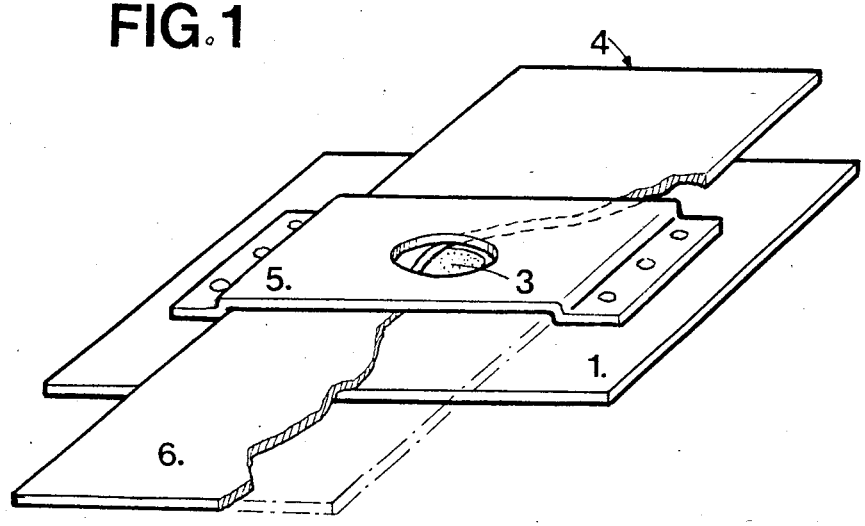
FIG. 1 is a perspective view of the embodiment.

In principle, it is preferable that the support and the holding plate be made of incombustible material, although it is not an essential condition in certain cases. Usually, the friction-strip is detached from the support after ignition, so that it could be made of combustible material, cardboard for example, in the case of strip 6 of FIG. 1. In any case, security is increased when the friction-strip is made of incombustible material.

We claim:

1. Igniter for combustible material, comprising a substantially planar support, an element made of a composition capable of being ignited by friction and supported on said planar support, and a friction-strip having at one end a surface portion treated in order to produce the ignition of the element by friction, the element being located in a space between the support and the friction-strip, a guide element affixed to said support and forming a channel in which said friction-strip is slidingly arranged, said guide element having an aperture formed therein, and means formed on said support for arranging the element to be ignited in said channel in opposing relationship to said aperture, such that upon ignition of the element flame therefrom passes through said aperture when said friction-strip is moved over a sufficient length to ignite and uncover the element, the means for arranging said element to be ignited adjacent the aperture comprises an indentation in said support which holds said element to be ignited.

2. Igniter according to claim 1, characterized in that the guide element and the support are constituted by two respective portions of a single folded plate.

3. Igniter according to claim 1, wherein said treated portion of the friction-strip is off set with respect to said element so that a sliding movement of said strip first brings said treated portion in contact with said element and then uncovers it.

4. Igniter according to claim 3, wherein said guide element is comprised of a plate affixed to said support.

5. Igniter according to claim 1, 3, or 4, characterized in that the support is made of an incombustible substance.

6. Igniter according to claim 5, characterized in that the support and guide element are made of an incombustible substance.

7. Igniter according to claim 1, 3, or 4, characterized in that the element is constituted in the form of a capsule.

8. Igniter according to claim 2 or 4, characterized in that the distance comprised between the support and the guide element is less than the thickness of the friction-strip, in order to produce pressure on the element to be ignited.

* * * * *